(12) United States Patent
Kodama

(10) Patent No.: US 6,590,598 B2
(45) Date of Patent: Jul. 8, 2003

(54) IMAGE FORMING APPARATUS

(75) Inventor: Kenichi Kodama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/793,907

(22) Filed: Feb. 28, 2001

(65) Prior Publication Data

US 2001/0017647 A1 Aug. 30, 2001

(30) Foreign Application Priority Data

Feb. 28, 2000 (JP) ........................................ 2000-051132

(51) Int. Cl.$^7$ ................................................. B41J 2/435
(52) U.S. Cl. ........................................ 347/234; 347/248
(58) Field of Search ........................... 347/40, 41, 130, 347/234, 238, 248, 12, 13, 47

(56) References Cited

U.S. PATENT DOCUMENTS 5,070,345 A * 12/1991 Lahut et al. ................... 347/41
5,988,790 A * 11/1999 Koike et al. .................. 347/41
6,190,001 B1 * 2/2001 Saruta .......................... 347/41
6,206,502 B1 * 3/2001 Kato et al. .................... 347/41

FOREIGN PATENT DOCUMENTS

| JP | 64-75255 | | 3/1989 | ............. B41J/3/04 |
| JP | 6-238917 | * | 8/1994 | ............ B41J/2/255 |
| JP | 8-12335 | | 2/1996 | ........... G02B/26/10 |
| JP | 8-174808 | * | 7/1996 | ............. B41J/2/01 |

* cited by examiner

*Primary Examiner*—Hai Pham
(74) *Attorney, Agent, or Firm*—Sughrue Mion, PLLC

(57) ABSTRACT

On a basis of a frequency analysis of the irregularities in density caused by a subscanning direction feed amount error of an exposure head, subscanning direction intervals between LEDs of the exposure head within the image forming apparatus are unequal such that the irregularities in density generated in an image is generated in high frequency area with a spatial frequency of at least 1 lp/mm. By using such image forming apparatus, an image is formed in which the irregularities in density is sufficiently suppressed in low frequency area with the spatial frequency of less than 1 lp/mm. Even if the irregularities in density is relatively large in high spatial frequency area, human eyes are difficult to view the irregularities in density thus the image quality can be improved.

13 Claims, 13 Drawing Sheets

F I G. 4
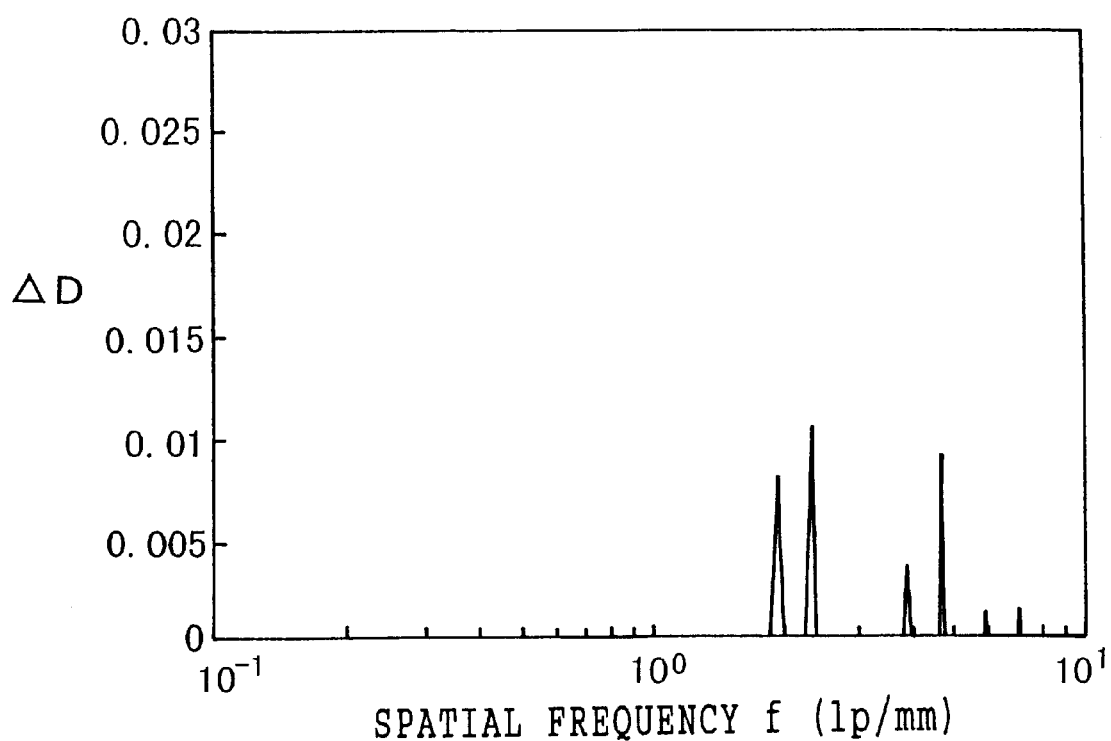

F I G. 1 2
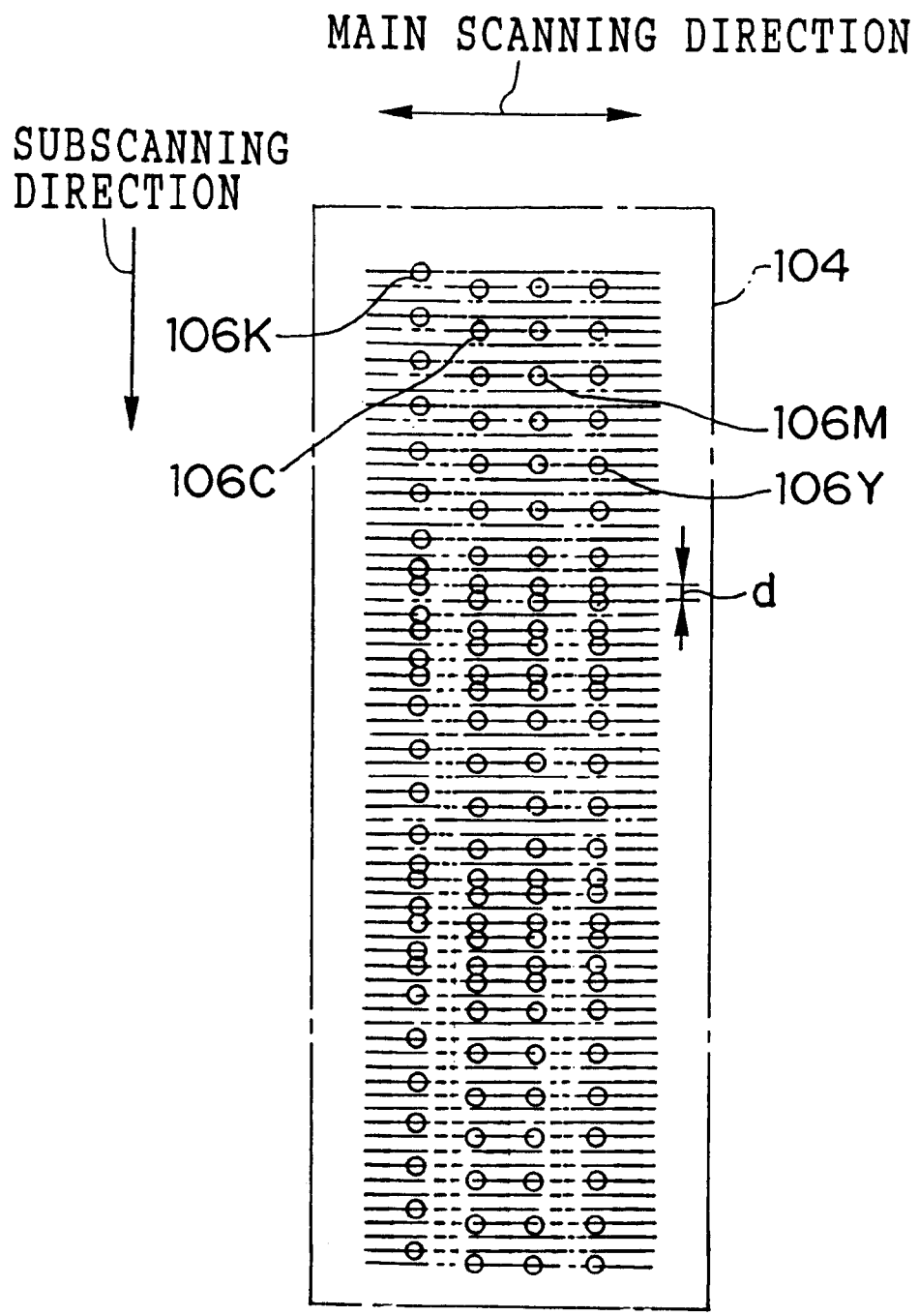

IMAGE FORMING APPARATUS

BACKGROUND OF THE INVENTION

1. Field of the Invention

The present invention relates to an image forming apparatus and an image forming method, and more particularly, to an image forming apparatus and a image forming method for effecting a so-called comb-teeth type printing.

2. Description of the Related Art

Among image forming apparatuses which form an image by scanning with an exposure head, it is disclosed an image forming apparatus which exposes an image on an exposure surface by carrying out a so-called "comb-teeth type exposure" (see Japanese Patent Application Publication (JP-B) No. 8-12335). Moreover, as disclosed in Japanese Patent Application Laid-Open (JP-A) No. 64-075255, in ink jet recording, there has been known a method in which lines are formed in a backward path between lines recorded in a forward path.

In the image forming apparatus which carries out the comb-teeth type exposure, light emitting elements (not shown) are arranged in the subscanning direction with equal distances therebetween. The first main scanning is carried out such that main scanning lines are main-scanned with fixed distances therebetween. Next, subscanning is carried out at a predetermined feed amount. Further, subsequent main scannings are carried out. As a result, the second or subsequent main scanning lines are sequentially inserted between the first adjacent main scanning lines. The main scanning is repeated for plural times while subscanning at the predetermined feed amount, and a final image is formed.

Hereinafter, a specific explanation will be made with an example for forming an image by an image forming apparatus in which 31 LEDs serving as light emitting elements are arranged with equal distances therebetween.

To form an image by the image forming apparatus, as shown in FIG. 13, the first main scanning lines represented by ▲ are firstly formed on an exposed body such as a photosensitive material or the like. As a result, main scanning lines are formed with all intermittent relative feed direction (subscanning direction) distances between adjacent spot lights (LED lights) being 2×d.

Then, the exposed body is moved in the subscanning direction by a feed amount of 1=31×d and is stopped. At this time, second main scanning lines represented by Δ are formed.

Further, the exposed body is moved in the subscanning direction by the feed amount 1. At this time, the third main scanning lines represented by ● are formed.

The fourth main scanning lines and subsequent lines are formed as described above.

In this way, an image with the distance between adjacent main scanning lines being d is formed.

In a case of carrying out such comb-teeth type exposure, if the subscanning direction feed amounts do not coincide correctly with each other for each subscanning, specific main scanning lines are close to each other such that a portion of the image corresponding to the lines is made dense. Alternatively, specific main scanning lines are apart such that a portion of the image corresponding to the lines are made fade. That is, irregularities in density is generated periodically on the image.

It is, however, difficult to coincide correctly subscanning direction feed amounts with each other. Accordingly, it is difficult to eliminate the irregularities in density of the image.

Such problems are not limited to a case in which the comb-teeth type exposure is carried out by an image forming apparatus which uses an exposure head. Such problems have also occurred in a case in which a so-called comb-teeth type printing (a method of printing with a recording head as the comb-teeth type exposure) is carried out by an apparatus having a general recording head such as an ink jet printer or the like.

SUMMARY OF THE INVENTION

In view of the aforementioned facts, an object of the present invention is to provide an image forming apparatus and an image forming method in which the visibility of irregularities in density is reduced even if there are intermittent relative direction feed amount errors and an image quality is improved.

In accordance with the first aspect of the present invention, an image forming apparatus, wherein each interval of plurality of recording elements provided at a recording head in an intermittent relative feed direction is set such that irregularities in density, generated in an image, due to a feed amount error between a recorded material and the recording head in the intermittent relative feed direction, is generated in an area with a spatial frequency of 1 lp/mm or more, is provided.

If the irregularities in density generated in the image is generated at an area with high spatial frequency, human eyes are difficult to view the irregularities in density. That is to say, in the area with high spatial frequency, even if there is relatively large irregularities in density, the irregularities in density is difficult to be viewed. Accordingly, in accordance with the first aspect of the present invention, the image quality can be improved.

In this specification, the irregularities in density means, for example, density distribution generated due to the difference between density distribution of an ideal image and density distribution of a actual image (between that of desired ideal image and that of actual printed image).

Representative examples of the recorded material and the recording head include an exposure head which exposes scanning light on a photosensitive paper, an ink jet head which ejects ink on an ink jet recording paper, and the like.

For example, in a case of an image forming apparatus having the exposure head which exposes scanning light on the photosensitive paper, recording elements are light emitting elements. The spatial frequency can be almost analyzed for each apparatus type by a subscanning direction feed amount of an exposed body and arrangement positions of the light emitting elements (or corresponding positions of spot lights from respective light emitting elements on the exposed body).

Here, the frequency analysis of the irregularities in density generated by an intermittent relative feed direction (subscanning direction) feed amount error of the exposed body is carried out with arrangement positions of light emitting elements (or the positions of the spot lights on the exposed body) being a parameter. On a basis of the analysis results, the subscanning direction distances between light emitting elements are set such that the irregularities in density is generated at high frequency area with the spatial frequency of at least 1 lp/mm, that is, the irregularities in density is sufficiently suppressed at low frequency area with the spatial frequency of less than 1 lp/mm.

As a result, the image quality of an image subjected to development and the like after exposure can be improved.

In accordance with a second aspect of the present invention, an image forming apparatus, wherein: each interval of plurality of pixels in an intermittent relative feed direction, recorded substantially simultaneously by a plurality of recording elements which are provided at a recording head, is a natural number multiplied by d, wherein a minimum interval of the pixel in the intermittent relative feed direction is d; a feed amount of the intermittent relative feed direction between a recorded material and the recording head is set to be (n×2×d/k), wherein a number of the recording elements is n, k is a natural number of 2 or more; and assuming that a pixel recorded by i th recording element is recorded on a position of the recorded material, which position is apart from a pixel recorded by a first recording element by a distance Li in the intermittent relative feed direction, each interval of plurality of the recording elements in the intermittent relative feed direction is set such that a pixel is not recorded on a position of the recorded material, which position is apart from the pixel recorded by the first recording element by a distance {Li+j×(n×2×d/k)} in the intermittent relative feed direction, wherein j is a natural number, is provided.

The value of k is determined by considering various types of parameters such as a resolution of the image forming apparatus and the like.

The pixel recorded by the i th recording element is recorded on the position of the recorded material which is apart from the pixel recorded by the first recording element in the intermittent relative feed direction by the distance Li, and a pixel is not recorded on the position which is apart from the pixel recorded by the first recording element by the distance {Li+j×(n×2×d/k)}. Thus, two pixels are prevented from being recorded on the same position of the recorded material. (Double exposure is prevented.)

For example, in a case of an image forming apparatus having the exposure head which exposes scanning light on the photosensitive paper, the recording elements are the light emitting elements. Assume that the subscanning direction distance (intermittent relative feed direction distance) of any adjacent spot lights which are projected on an exposed body (photo sensitive paper) by the light emitting elements is a natural number multiple of the minimum subscanning direction distance d, the number of light emitting elements is n and k is a natural number of at least 2, the subscanning direction feed amount of the exposed body is set to be (n×2×d/k). If a spot light formed by the i th light emitting element is projected on a position of the exposed body which is apart from the spot light formed by the first light emitting element in the subscanning direction by the distance Li, the subscanning direction distances between light emitting elements are set such that a spot light is not projected on a position which is apart from the spot light formed by the first light emitting element by the distance {Li+j×(n×2×d/k)}.

The spot light formed by the i th light emitting element is projected on a position of the photosensitive paper which is apart from the spot light formed by the first light emitting element by the distance Li. Moreover, a spot light is not projected on a position which is apart from the spot light formed by the first light emitting element by the distance {Li+j×(n×2×d/k)}. Thus, two pixels are avoided from being exposed on the same position of the photosensitive paper. (Double exposure is prevented.)

The image forming apparatus may have three, four or five types of the intervals of plurality of pixels in an intermittent relative feed direction. For example, the image forming apparatus may have the intervals, for example, d, 2×d, 3×d, 4×d, 5×d. Namely, intervals of plurality of pixels in an intermittent relative feed direction includes in this case are five types. Number of types of the intervals is not limited to the same.

In accordance with a third aspect of the present invention, an image forming apparatus according to the first aspect of the second aspect, wherein a plurality of recording element rows, in which each of recording element rows the recording elements are arranged, are provided in a direction substantially perpendicular to the intermittent relative feed direction, is provided.

Therefore, it is possible to form pixels while operations which are different for each recording element row are carried out. For example, in a case of forming a color image with three primary colors of R, G and B, there are three recording element rows for R (red), G (green) and B (blue). Thereby a color image with improved image quality can be formed.

In accordance with a fourth aspect of the present invention, an image forming apparatus according to the third aspect or the fourth aspect, wherein the recording element rows are provided in at least two arrangement patterns, is provided.

Thus, the spatial frequency of the irregularities in density is higher and the irregularities in density is more difficult to be viewed.

In accordance with a fifth aspect of the present invention, an image forming method for forming an image on a recorded material by a comb-teeth type printing by using an image forming apparatus, in which each interval of plurality of recording elements provided at a recording head in an intermittent relative feed direction is set such that irregularities in density, generated in an image, due to a feed amount error between the recorded material and the recording head in the intermittent relative feed direction, is generated in an area with a spatial frequency of 1 lp/mm or more, is provided.

Thus, an image in which quality is improved can be easily formed.

In accordance with a sixth aspect of the present invention, an image forming apparatus according to the second aspect, wherein the first recording element is an element positioned at one end portion of a recording element row in which the plurality of recording elements are arrange, is provided.

In accordance with a seventh aspect of the present invention, an image forming apparatus which forms an image by repeating for a plurality of times a relative movement of a recorded material and a recording portion for recording an image in a subscanning direction at a predetermined amount and a relative movement of the recorded material and the recording portion in the main scanning direction, the image forming apparatus comprising: a plurality of recording elements which are provided at the recording portion and which are arranged in at least one row in the subscanning direction; wherein the plurality of recording elements are arranged with non-uniform interval thereof in the subscanning direction, is provided.

In accordance with an eighth aspect of the present invention, an image forming apparatus according to the seventh aspect, wherein distances, each of which is a distance between the recording elements which are adjacent in the subscanning direction, include at least three types of distances (a×d), (b×d) and (c×d), wherein a, b, c are natural numbers which are different from each other, and a minimum interval between adjacent pixels in the subscanning direction is d, is provided.

In accordance with a ninth aspect of the present invention, an image forming apparatus according to the seventh aspect, wherein the plurality of recording elements are arranged in a plurality of recording element rows arranged in the main scanning direction, is provided.

In accordance with a tenth aspect of the present invention, an image forming apparatus according to the ninth aspect, wherein the plurality of recording element rows are provided such that arrangement patterns of at least two recording element rows among the plurality of recording element rows are different, is provided.

BRIEF DESCRIPTION OF THE DRAWINGS

FIG. 4 is a graph showing irregularities in density with respect to a spatial frequency of an image formed by the image forming apparatus relating to the first embodiment.

FIG. 12 is a rear view of a printing portion of an image forming apparatus relating to a sixth embodiment.

DESCRIPTION OF THE PREFERRED EMBODIMENTS

Figure 1:
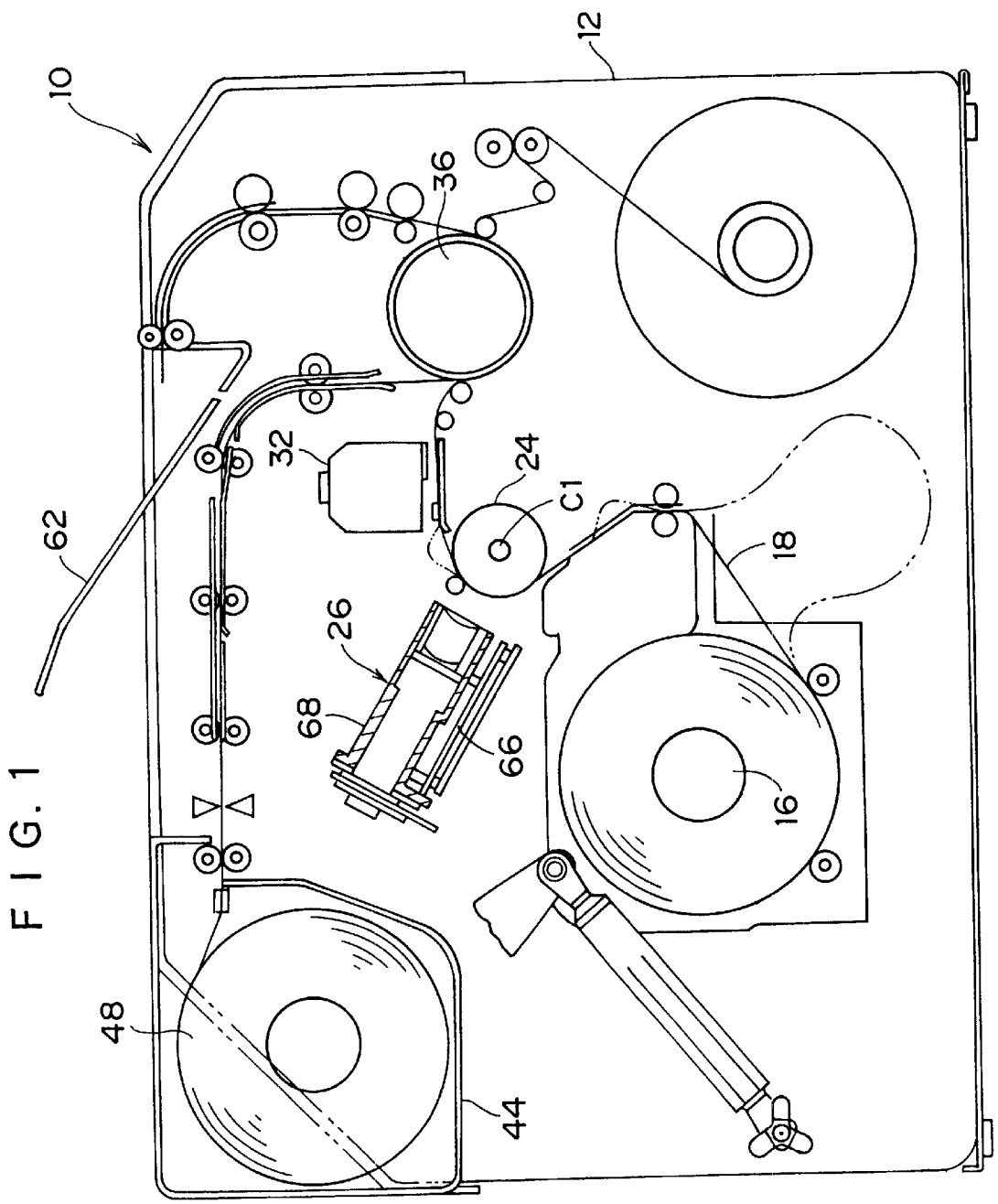
FIG. 1 is a side cross-sectional view showing a structure of an image forming apparatus relating to a first embodiment.

As shown in FIG. 1, an exposure drum 24 about which a photosensitive material 18 supplied from a supply reel 16 is entrained and an exposure head 26 which exposes an image onto the entrained photosensitive material 18 are provided within a housing 12 of an image forming apparatus 10 relating to a first embodiment. Water supplied from an applying tank 32 is applied to the photosensitive material 18 after exposure. Then, the photosensitive material 18 is placed upon an image receiving paper 48 supplied from an image receiving paper magazine 44 and is entrained about a heat drum 36. As a result, an image is transferred to the image receiving paper 48. The image receiving paper 48 is fed to a tray 62.

Figure 2:
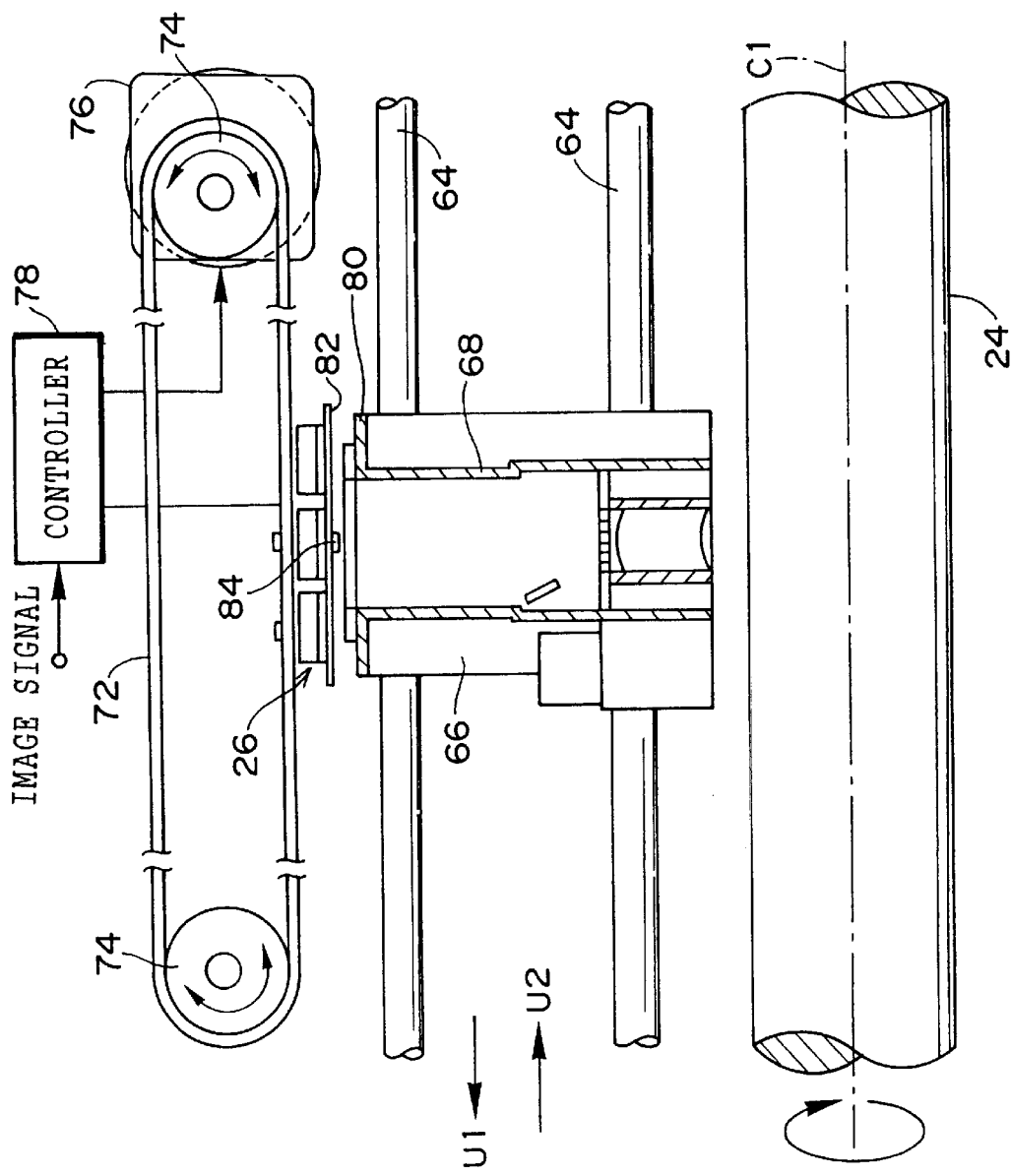
FIG. 2 is a structural view of an exposure head of the image forming apparatus relating to the first embodiment and a vicinity thereof.

As shown in FIG. 2, two shafts 64 for guiding the exposure head 26 are disposed in parallel to a rotational shaft C1 of the exposure drum 24. These shafts 64 are inserted into supporting holes which penetrate a supporting block 66. The supporting block 66 can slide along the shafts 64 such that the exposure head 26 can reciprocate in the main scanning direction.

A casing 68 of the exposure head 26 is fixed to the supporting block 66. An endless timing belt 72 is fixed via a connecting plate (not shown) to the casing 68. The timing belt 72 is entrained about sprockets 74 provided in vicinities of ends of the shafts 64. Rotational force is transmitted from a stepping motor 76 via a transmission (not shown) to the sprockets 74. The exposure head 26 reciprocates along the shafts 64 due to forward and reverse rotations of the stepping motor 76.

Driving of the stepping motor 76 is controlled by a controller 78 and is synchronized with stepwise driving of the photosensitive material 18 (see FIG. 1). That is, the photosensitive material 18 is moved stepwise in the longitudinal direction (the subscanning direction) and is stopped. At this time, the controller 78 rotates forward the stepping motor 76. Thereby the exposure head 26 is moved forward along the shafts 64, i.e., in the main scanning direction U1. After a light is emitted at a predetermined pulse, the photosensitive material 18 is moved stepwise in the subscanning direction and is stopped. In this state, the controller 78 rotates in reverse the stepping motor 76. As a result, the exposure head 26 is moved backward along the shafts 64, i.e., moved in the main scanning direction U2.

A substrate 82 on which 30 LEDs 84 are arranged is fixed to a top plate 80 of the casing 68. These LEDs 84 emit light by a signal from the controller 78 to which an image signal is inputted.

The controller 78 controls such that a feed amount of the photosensitive material 18 in the subscanning direction is a fixed amount. For example, if a center of the exposure drum 24 is deviated a little or if irregularities are formed on a surface of the exposure drum 24, the feed amount of the photosensitive material 18 is not a fixed amount thus a little error in the feed amount is generated. As described above, the subscanning direction feed amount error is usually different for each apparatus type. A spatial frequency area where the irregularities in density is generated is substantially determined by the subscanning direction feed amount error.

Human eyes are difficult to view the irregularities in density in high spatial frequency area even if the maximum value of the irregularities in density is large.

In the first embodiment, when LEDs are arranged, the spatial frequency area of the irregularities in density caused by the subscanning direction feed amount error is analyzed with the arranged positions of LEDs being a parameter. On the basis of the analyzed result, the LEDs are arranged such that a subscanning direction distance between adjacent LEDs is set so as to sufficiently suppress the maximum value of the irregularities in density in low spatial frequency area with a spatial frequency of less than 1 lp/mm.

Figure 3:
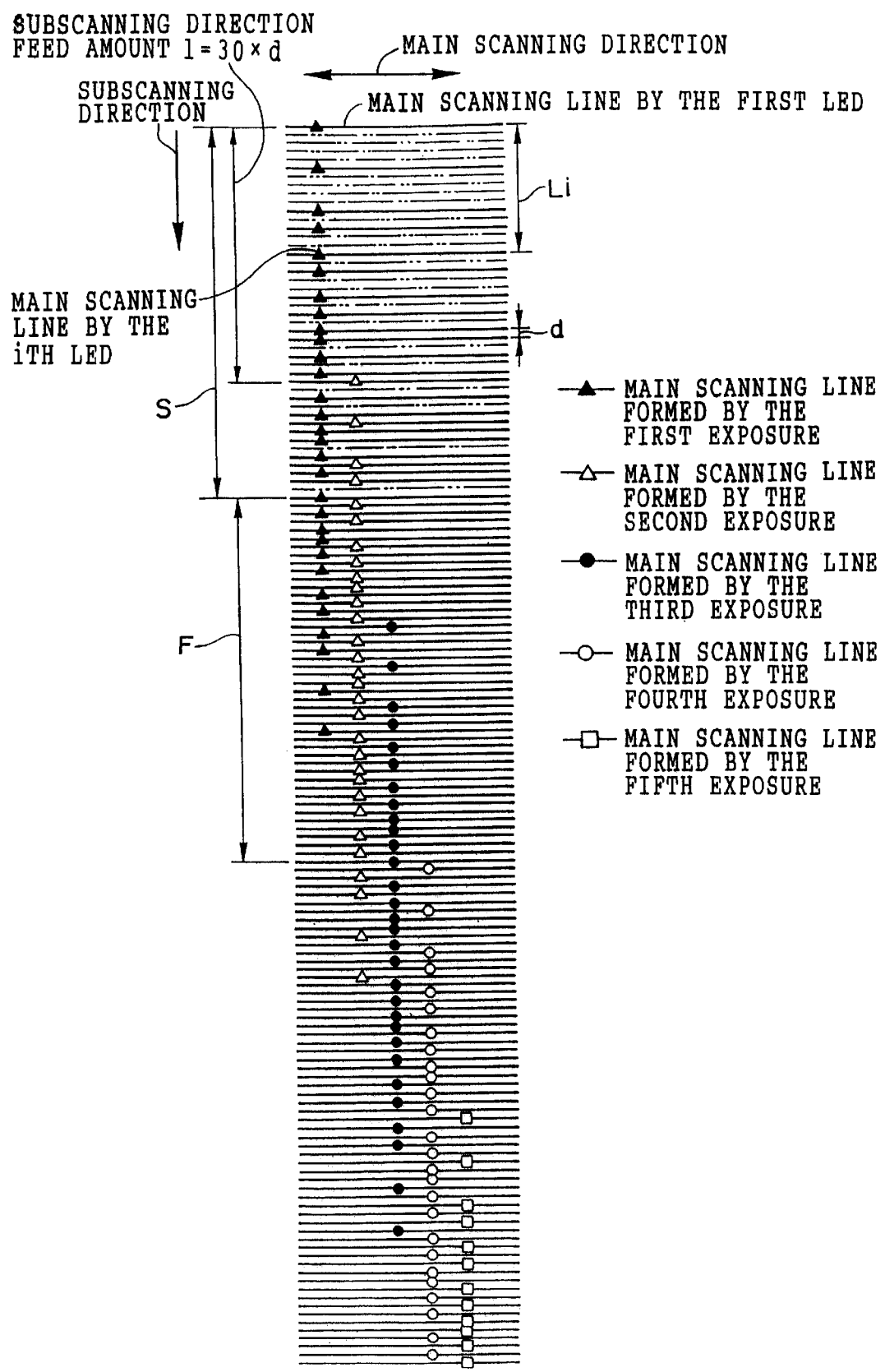
FIG. 3 is a plan view showing main scanning lines formed by the image forming apparatus relating to the first embodiment.

Specifically, as shown in FIG. 3, assume that the number of LEDs 84 is n=30 as described above, a minimum subscanning direction distance between adjacent spot lights on a photosensitive material is d, the subscanning direction feed amount of the photosensitive material 18 is l=30×d (i.e., k described in the second aspect is 2). When arranging the LEDs, if a spot light formed by the i th LED is projected on a position of the photosensitive material 18 which is apart in the subscanning direction by the distance Li from the spot light formed by the first LED, the LEDs are arranged such that a spot light is not projected on a position which is apart by the distance $\{Li+j\times(30\times d)\}$ (wherein j is a natural number) from the spot light formed by the first LED.

30 LEDs may be arranged in one line in the subscanning direction or may not be arranged in one line. That is, the LEDs may not be coincide in the main scanning direction. For example, the LEDs may be arranged to be five columns by six rows, that is, five LEDs are arranged in the subscanning direction and six LEDs are arranged in the main scanning direction. Light which is to be exposed onto the photosensitive material by emission of the LEDs 84 is a Gaussian beam with a half value width of 150 μm. A beam spot length error is about 5 μm.

An operation for forming an image using the image forming apparatus relating to the first embodiment will be described hereinafter. When an image signal corresponding to image information is inputted to the controller 78 and the LEDs 84 are lit, an amount of lights from these LEDs 84 is adjusted to be a suitable light amount with respect to the photosensitive material 18 by an ND filter (not shown) or the like.

Next, the controller 78 rotates forward the stepping motor 76. The exposure head 26 is moved along the shafts 64 in the main scanning direction. Thus, as shown in FIG. 3, first main scanning lines represented by ▲ are formed.

Then, the exposure drum 24 is rotated in the subsensitive direction and is stopped. At this time the photosensitive material 18 is moved stepwise in the subscanning direction by the distance l.

The LEDs 84 are lit, and the stepping motor 76 is rotated in reverse. Then second main-scanning lines represented by Δ are formed.

Further, the photosensitive material 18 is moved stepwise in the subscanning direction by the distance l. Third main-scanning lines represented by ● are formed in the same manner as in a case of forming the first main-scanning lines. In this way, the comb-teeth type exposure is repeated three times. As a result, an exposed image which is perfect in a range with the subscanning direction width F is formed. (an exposed image whose formation is completed in the range with the subscanning direction F is formed.)

The fourth main-scanning lines and subsequent lines are formed as described above.

The area which is formed at a time of initial image formation and where some main scanning lines are missing (i.e., the area with the subscanning direction width S shown in FIG. 3) does not contribute to actual image formation. Accordingly, it is preferable that light is not irradiated onto this area from corresponding LEDs.

Hereinafter, measurement results of the irregularities in density of an image formed by the above-described manner will be explained. The irregularities in density D of the image shown in FIG. 3 is measured. As shown in FIG. 4, in the area with the spatial frequency of at least f=1 lp/mm (i.e., high frequency area), maximum values (peak values) are generated. In the area with the spatial frequency of less than f=1 lp/mm (i.e., low frequency area), however, ΔD is a value less than a measurement limit.

Figure 5:
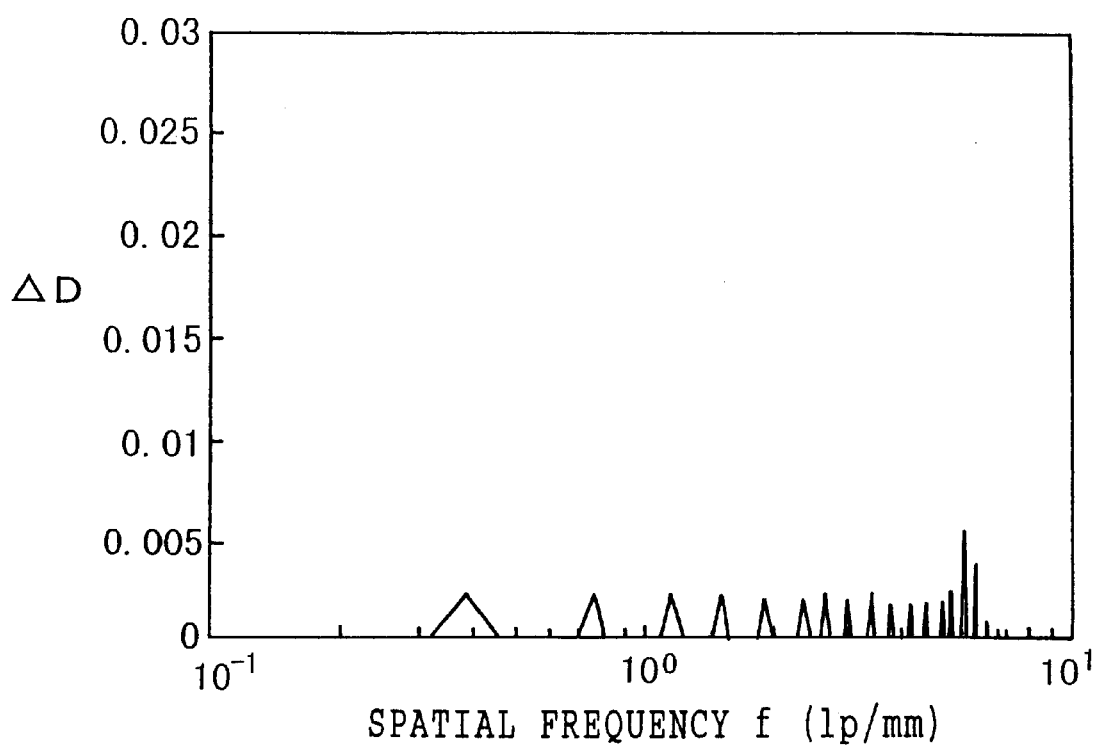
FIG. 5 is a graph showing the irregularities in density with respect to the spatial frequency of an image formed by a conventional image forming apparatus.
Figure 13:
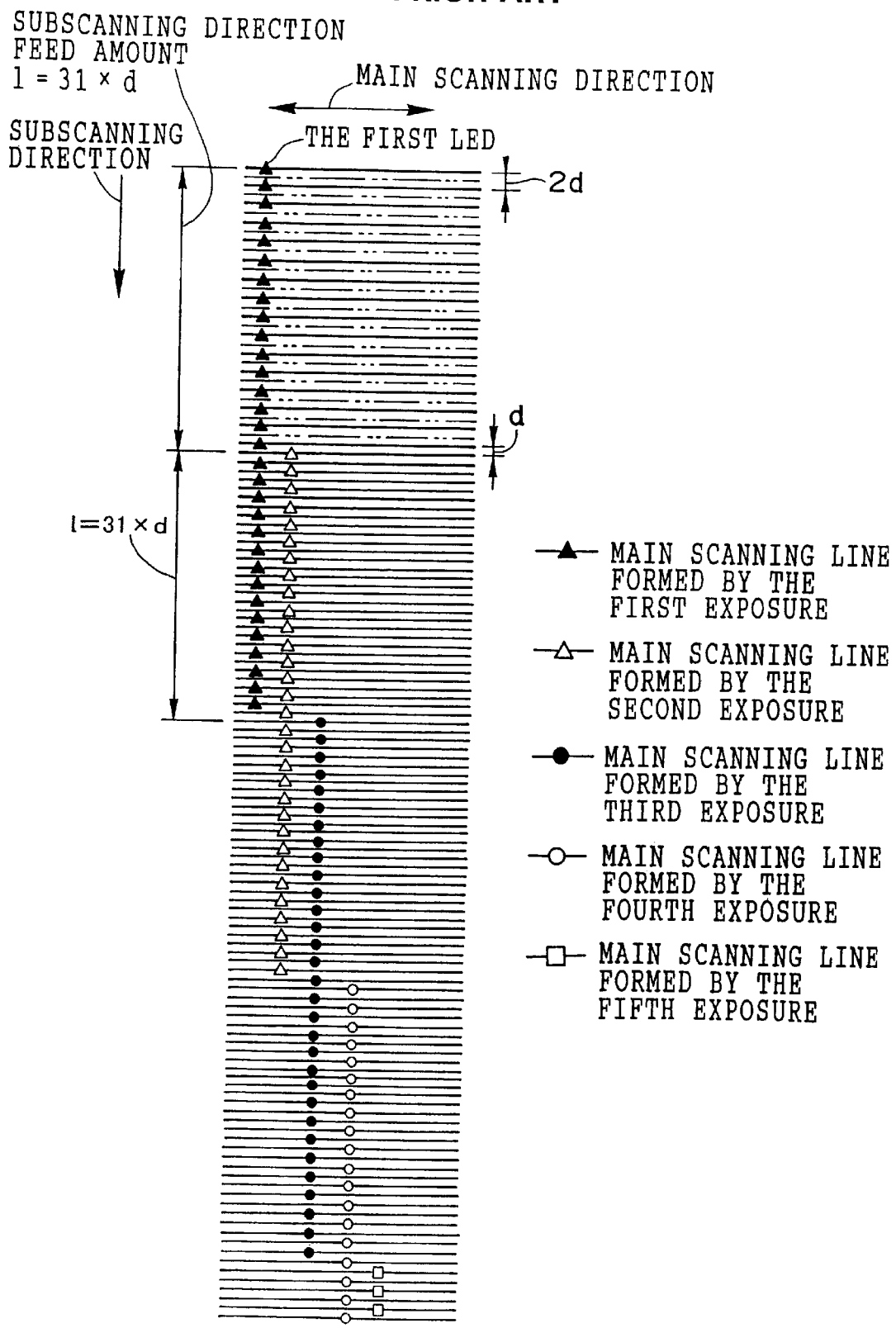
FIG. 13 is a plan view showing main scanning lines formed by a conventional image forming apparatus.

To make a comparison, the irregularities in density ΔD of an image which is shown in FIG. 13 and which is formed by a conventional image forming apparatus is measured. As shown in FIG. 5, maximum values are generated even in low frequency area with the spatial frequency of less than f=1 lp/mm.

As described above, when an image is formed by the image forming apparatus 10 relating to the first embodiment, even if subscanning direction feed amount (errors) of the photosensitive material vary, that is, even if subscanning direction distances between adjacent main scanning lines S vary, variation amounts of the subscanning direction distances are not uniform. Thus, the maximum value of the irregularities in density generated in the image is observed only in high frequency area with the spatial frequency of at least 1 lp/mm. As a result, the image quality can be improved.

A second embodiment of the present invention will be described hereinafter. In an image forming apparatus relating to the second embodiment, assume that the number of LEDs 84 is n=30, a minimum subscanning direction distance between adjacent spot lights on a photosensitive material is d, a subscanning direction feed amount is l=30×d (k described in the second aspect is 2). As in the first embodiment, if a spot light formed by the ith LED is projected on a position which is apart in the subscanning direction by the distance Li from a spot light formed by the first LED, LEDs are arranged such that a spot light is not projected on a position which is apart by the distance {Li+j×(30×d)} (wherein j is a natural number) from the spot light formed by the first LED. Here, in the second embodiment, LEDs are arranged on the exposure head so as to form main scanning lines shown in FIG. 6.

The same components as those of the first embodiment will be denoted by the same reference numerals, and a description thereof will be omitted. An operation for forming an image using the image forming apparatus relating to the second embodiment will be described.

When an image signal corresponding to image information is inputted to the controller 78, LEDs 84 are lit.

Figure 6:
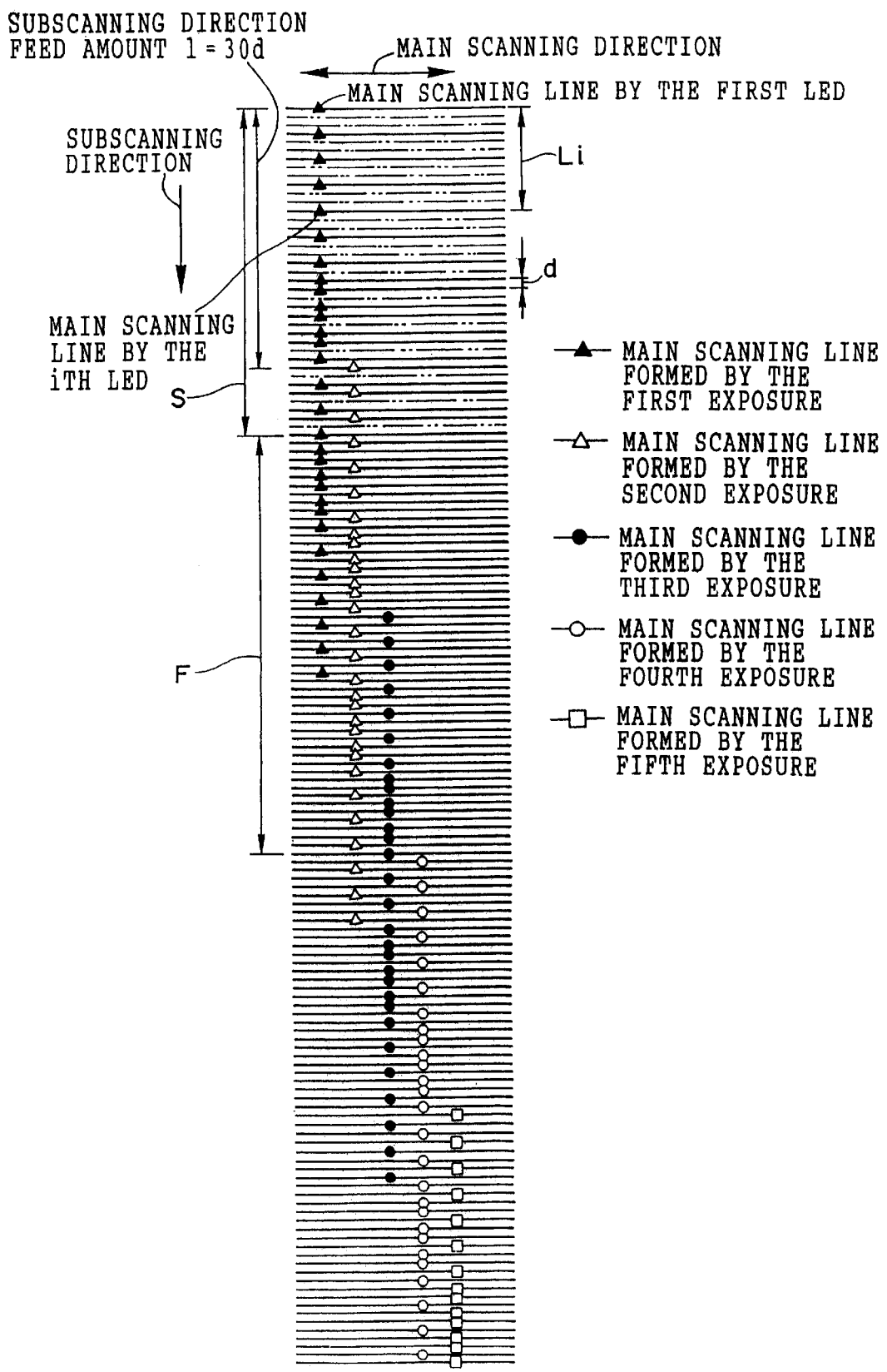
FIG. 6 is a plan view showing main scanning lines formed by an image forming apparatus relating to a second embodiment.

Next, the controller 78 rotates forward the stepping motor 76, and the exposure head 26 is moved along the shafts 64 in the main scanning direction. Thus, as shown in FIG. 6, first main scanning lines represented by ▲ are formed.

Then, the exposure drum 24 is rotated in the subscanning direction and is stopped. The photosensitive material 18 is moved stepwise in the subscanning direction by the distance l, as in the first embodiment.

The LEDs 84 are lit. The stepping motor 76 is rotated in reverse such that the second main scanning lines represented by Δ are formed.

Further, the photosensitive material 18 is moved stepwise in the subscanning direction by the distance l such that the third main scanning lines represented by ● are formed as in the case of forming the first main scanning lines. The comb-teeth type exposure is repeated three times so as to form an exposed image which is perfect in a range with the subscanning direction width F. (an exposed image whose formation is completed in the range with the subscanning direction F is formed.)

The fourth main scanning lines and subsequent lines are formed as described above.

As in the first embodiment, the area which is formed at a time of initial image formation and where some main scanning lines are missing (i.e., the area with the subscanning direction width S shown in FIG. 6) does not contribute to actual image formation. Thus, it is preferable that light is not irradiated from corresponding LED.

Figure 7:
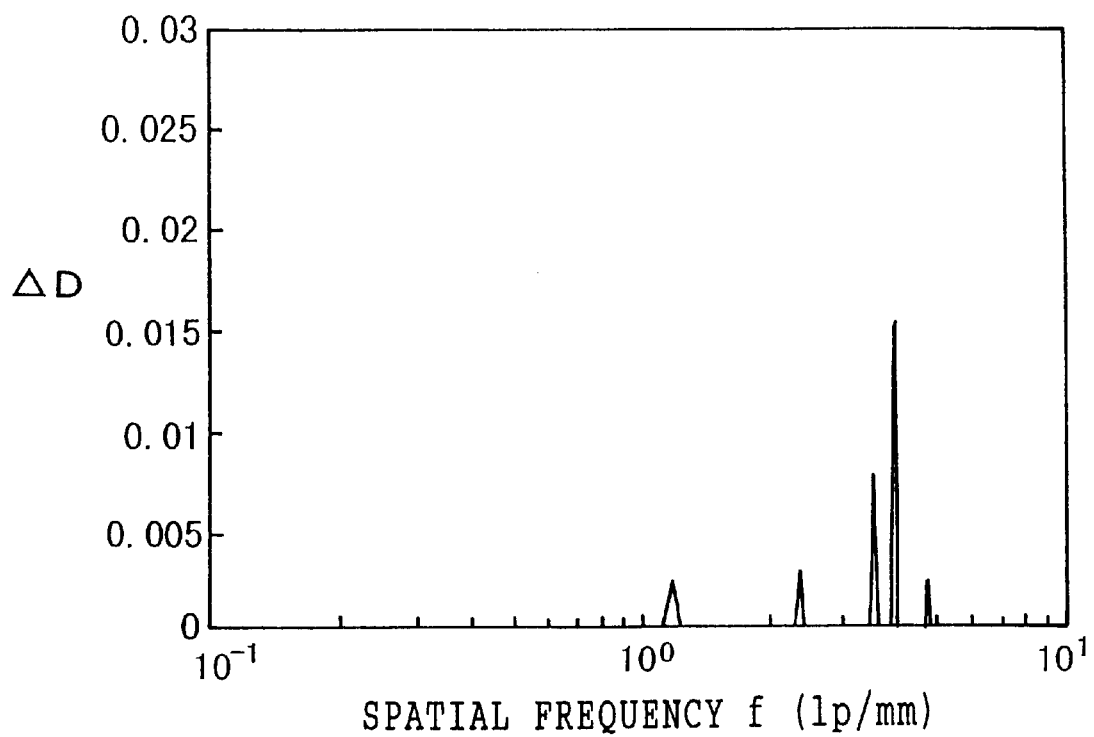
FIG. 7 is a graph showing the irregularities in density with respect to the spatial frequency of an image formed by the image forming apparatus relating to the second embodiment.

Measurement results of the irregularities in density generated in an image formed by the above-described manner will be explained hereinafter. The irregularities in density ΔD of the image shown in FIG. 6 is measured. As shown in FIG. 7, in the area with the spatial frequency of at least f=1 lp/mm (i.e., high frequency area), maximum values are generated. In the area with the spatial frequency of less than f=1 lp/mm (i.e., low frequency area), ΔD is a value less than a measurement limit.

As described above, when an image is formed by the image forming apparatus relating to the second embodiment, even if the subscanning direction feed amount (errors) of the photosensitive material vary, that is, even if the subscanning direction distances between adjacent main scanning lines S vary, the variation amounts of the subscanning direction distances are not uniform. Thus the maximum values of the irregularities in density generated in the image are observed only in high frequency area with the spatial frequency of at least 1 lp/ mm. Accordingly, the image quality can be improved.

Figure 8:
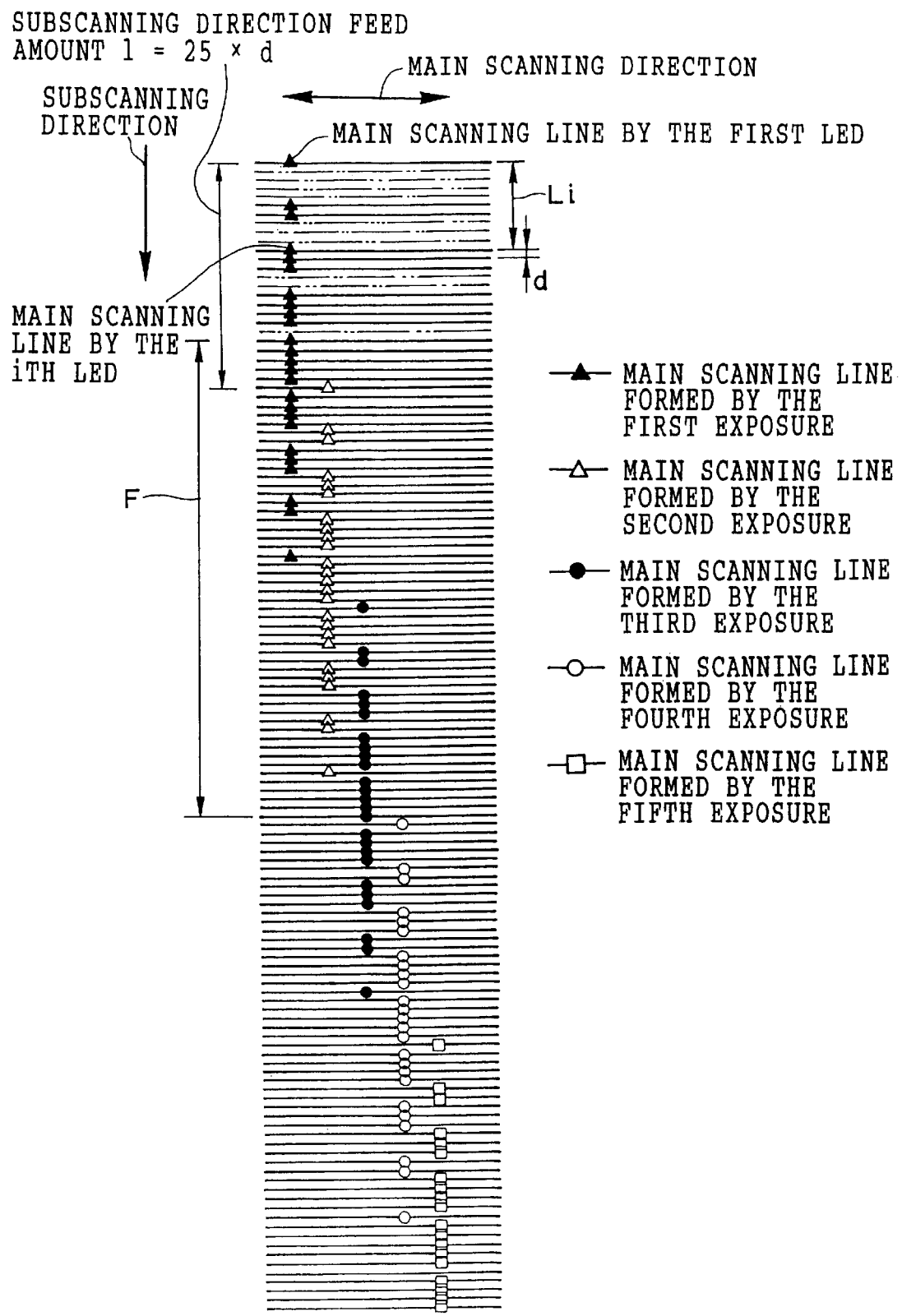
FIG. 8 is a plan view showing main scanning lines formed by an image forming apparatus relating to a third embodiment.

A third embodiment of the present invention will be described hereinafter. In the image forming apparatus relating to the third embodiment, assume that the number of LEDs 84 (see. FIG. 8) is n=25, the minimum subscanning direction distance between adjacent spot lights on the photosensitive material is d and the subscanning direction feed amount is l=25×d (that is, k described in the second aspect is 2).

If a spot light formed by the ith LED is projected on a position which is apart in the subscanning direction by the distance Li from the spot light formed by the first LED, the LEDs are arranged such that a spot light is not projected on a position which is apart from the spot light formed by the first LED by the distance {Li+j×(25×d)} (wherein j is a natural number). This arrangement forms main scanning lines shown in FIG. 8.

An operation for forming an image using the image forming apparatus relating to the third embodiment will be described.

As in the first and the second embodiments, an image signal corresponding to image information is inputted to the controller 78. Then, the LEDs 84 are lit. The controller 78 rotates forward the stepping motor 76. The exposure head 26 is moved along the shafts 64 in the main scanning direction. As shown in FIG. 8, first main scanning lines represented by ▲ are formed.

Then, the exposure drum 24 is rotated in the subscanning direction and is stopped. The photosensitive material 18 is moved stepwise in the subscanning direction by the distance l.

The LEDs 84 are lit, the stepping motor 76 is rotated in reverse such that second main scanning lines represented by Δ are formed.

Further, the photosensitive material 18 is moved stepwise in the subscanning direction by the distance l. Thereby third main scanning lines represented by ● are formed as in the case of forming the first main scanning lines. The comb-teeth type exposure is repeated three times thereby an image which is perfect in the range with the subscanning direction width F is formed.

The fourth main scanning lines and subsequent lines are formed as described above.

In the image formed by the above-described manner, maximum values of the irregularities in density are observed not in the area with low spatial frequency but only in the area with high spatial frequency. Accordingly, human eyes cannot view the irregularities in density. As a result, the image quality can be improved.

A fourth embodiment of the present invention will be described hereinafter. An image forming apparatus relating to the fourth embodiment is a color image forming apparatus which forms an image with three primary colors of R, G and B. Light emitting elements are arranged in three rows in a direction perpendicular to the main scanning direction, i.e., in the subscanning direction (that is, the plurality of rows in the third aspect is 3).

In each row of the light emitting elements, assume that the number of LEDs is n=30, a minimum intermittent relative feed direction distance (subscanning direction distance) between adjacent spot lights on a photosensitive material is d, a subscanning direction feed amount is l=30×d (that is, k described in the second aspect is 2). Moreover, if a spot light formed by the ith LED is projected on a position which is apart in the subscanning direction by the distance Li from the spot light by the first LED, the LEDs are arranged such that a spot light is not projected on a position which is apart from the spot light formed by the first LED by the distance {Li+j×(30×d)} (wherein j is a natural number).

The light emitting elements for carrying out a G exposure (an exposure for printing magenta M) are arranged such that main scanning lines shown in FIG. 3 are formed. The light emitting elements for carrying out an R exposure (an exposure for printing cyan C) and a B exposure (an exposure for printing yellow Y) are arranged such that main scanning lines shown in FIG. 6 are formed.

When a color image is formed by the image forming apparatus relating to the fourth embodiment, even if the subscanning direction feed amount (errors) of the photosensitive material vary, that is, even if the subscanning direction distances between adjacent main scanning lines S vary, the variation amounts of the subscanning direction distances are not uniform. Thus the maximum values of the irregularities in density of the colors generated in the image are observed only in high frequency area with the spatial frequency of at least 1 lp/mm. Accordingly, the image quality of the color image can be improved.

Further, there are two kinds, not one kind, of arrangement schemes of the light emitting elements (that is, there are an arrangement for forming main scanning lines shown in FIG. 3 and an arrangement for forming main scanning lines shown in FIG. 6). As compared to the first and the second embodiments, the frequency of the irregularities in density is generated in higher spatial frequency such that the irregularities in density is difficult to be viewed. Moreover, in the area with the spatial frequency of around 1 lp/mm, irregularities in color is more difficult to be viewed than the irregularities in density, thereby higher image quality can be accomplished.

A fifth embodiment of the present invention will be described hereinafter. An image forming apparatus relating to the fifth embodiment is an ink jet color printer for forming a color image with black (K), cyan (C), magenta (M) and yellow (Y).

Figure 9:
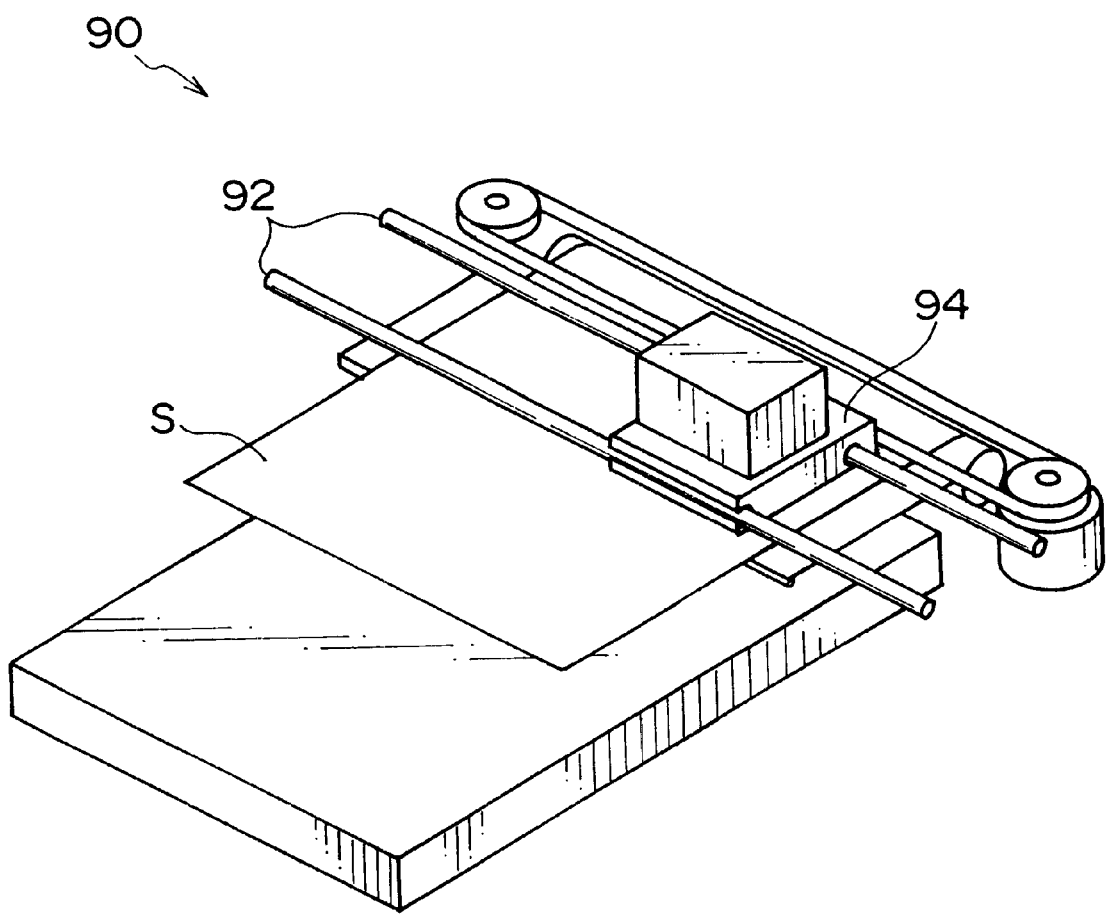
FIG. 9 is a perspective view of a printing portion of an image forming apparatus relating to a fifth embodiment.

As shown in FIG. 9, a printing portion 90 which forms the image forming apparatus relating to the fifth embodiment is provided with guide rails 92 provided in parallel to each other along the main scanning direction and a recording head 94 which is guided along the guide rails 92 so as to eject an ink while reciprocating on a recording paper S. The recording paper S is fed in an intermittent relative feed direction (subscanning direction) at a predetermined feed amount.

Figure 10:
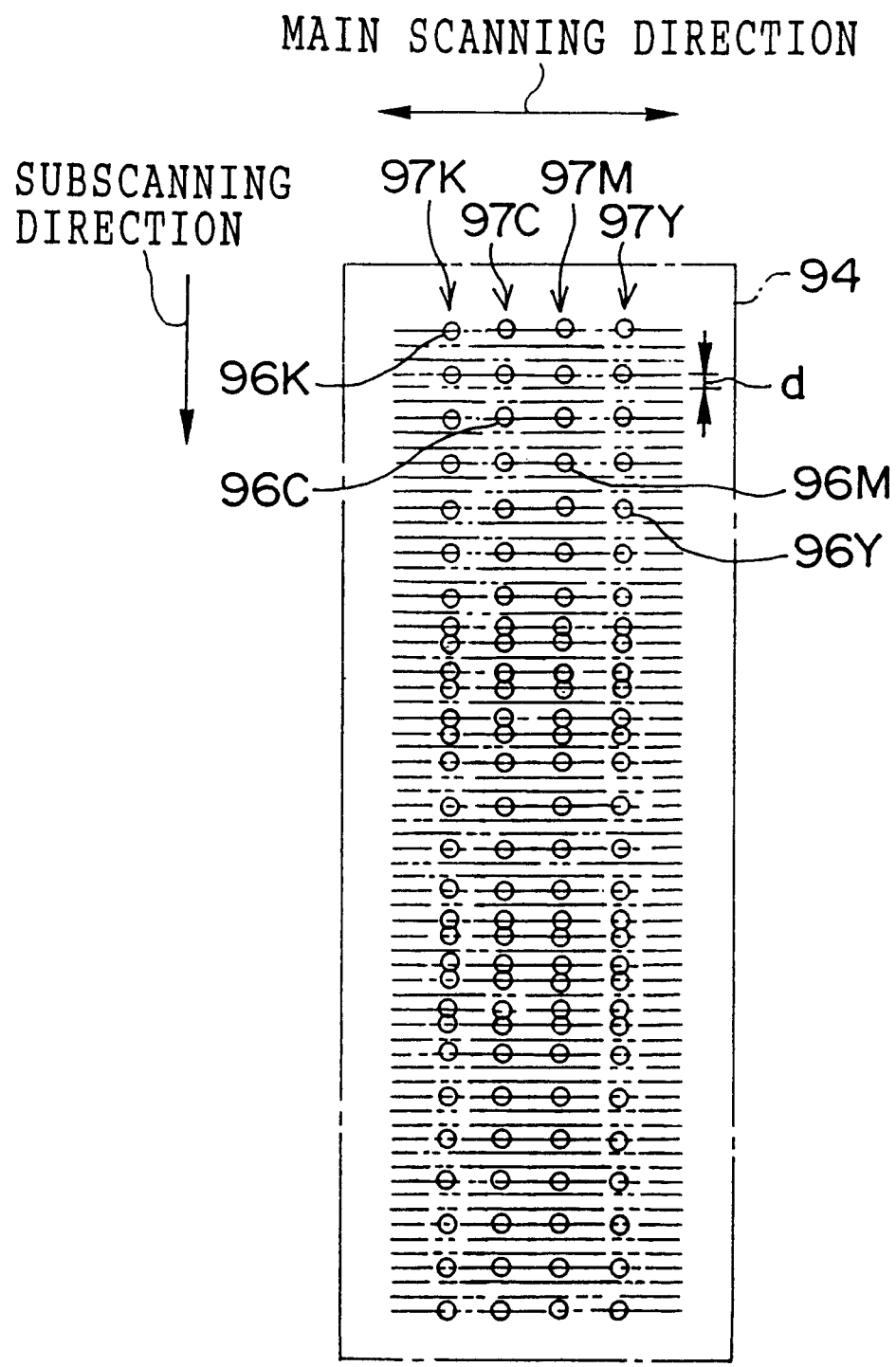
FIG. 10 is a rear view of the printing portion of the image forming apparatus relating to the fifth embodiment.

As shown in FIG. 10, ejecting holes 96K, 96C, 96M and 96Y, each of which has 30 holes and which eject a black (K) ink, a cyan (C) ink, a magenta (M) ink and a yellow (Y) ink, respectively, are formed at an ink ejecting surface of the recording head 94.

An arrangement pattern 97K of the ejecting holes 96K is an arrangement pattern such that main scanning lines shown in FIG. 6 are formed by black ink ejected from the ejecting holes 96K, and is similar to the arrangement pattern of the LEDs of the image forming apparatus relating to the second embodiment.

The ejecting holes 96C, 96M and 96Y are arranged, in the main scanning direction of the ejecting holes 96K. Accordingly, respective arrangement patterns 97C, 97M and 97Y of the ejecting holes 96C, 96M and 96Y are the same as the arrangement pattern 97K of the ejecting holes 96K. Main scanning lines shown in FIG. 6 are formed by respective inks ejected from the ejecting holes 96C, 96M and 96Y.

When printing is carried out upon the recording paper S with the image forming apparatus relating to the fifth embodiment, at a time of ejecting inks, while inks of four colors are all ejected, that is, while inks are ejected from all ejecting holes 96K, 96M, 96Y and 96C, the exposure drum 24 is rotated and then is stopped as in the second embodiment. The photosensitive material 18 is moved stepwise by the distance 1 in the subscanning direction such that main scanning lines are subsequently formed (a comb-teeth type printing).

Thus, as in the second embodiment, the maximum values of the irregularities in density generated in an image are observed only in high frequency area with the spatial frequency of at least 1 lp/mm. Accordingly, the image quality can also be improved in the ink jet color printer.

Figure 11:
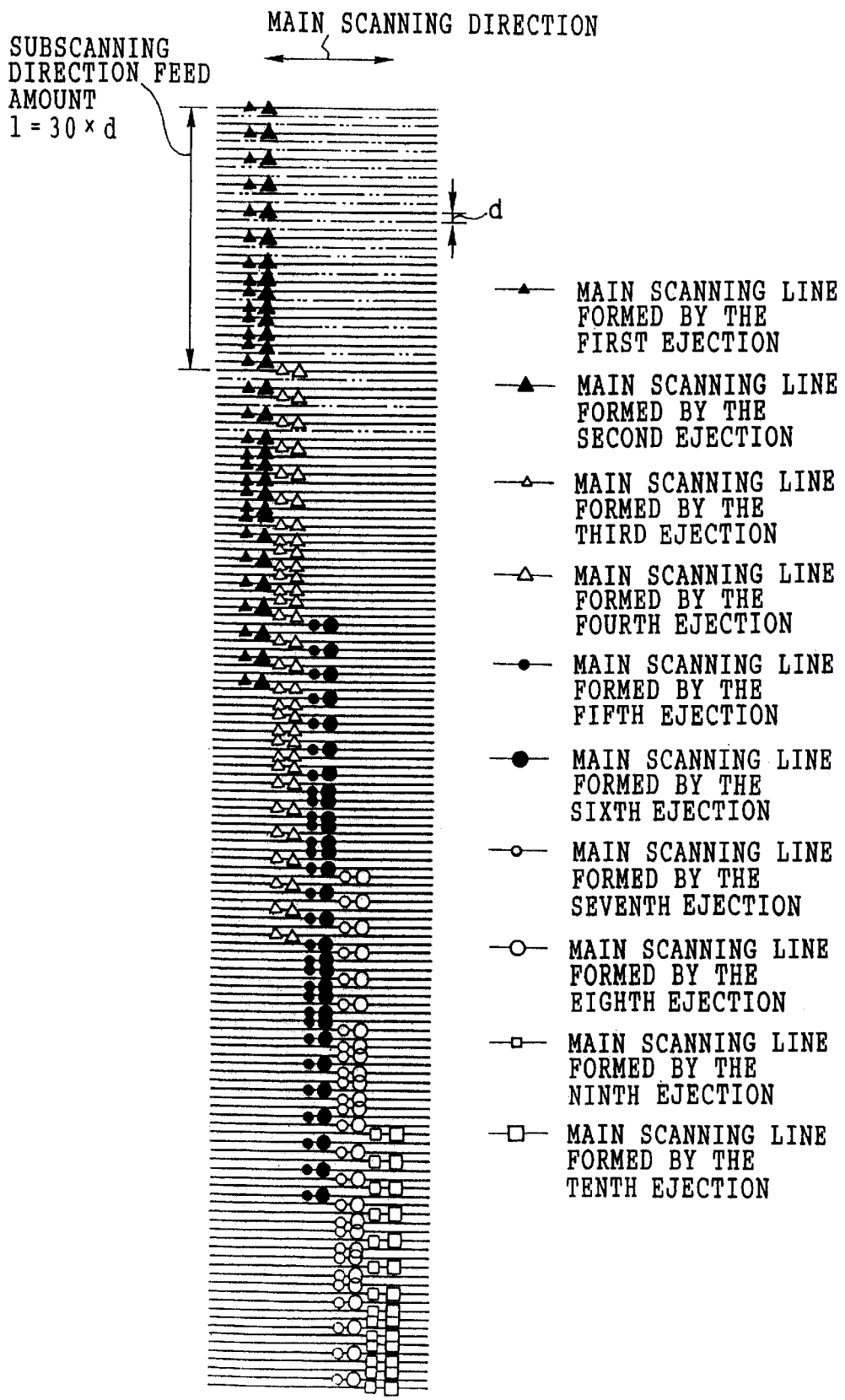
FIG. 11 is a plan view showing main scanning lines formed by using the image forming apparatus relating to the fifth embodiment such that a timing for ejecting black ink is different from a timing for ejecting other inks.

When printing on the recording paper S, in each scanning, ink is ejected only from the ejecting holes 96K and not from the ejecting holes 96C, 96M and 96Y. Then, inks are ejected on the same main scanning line only from the ejecting holes 96C, 96M and 96Y not from the ejecting holes 96K. As specifically explained, as shown in FIG. 11, when the first time main scanning lines (the main scanning lines at the first time) represented by ▲ (small) are formed, only black ink is ejected from the ejecting holes 96K and other color inks are not ejected. Then, when the second time main scanning lines (the main scanning lines at the second time) represented by ▲ (big) are formed, while scanning on the same scanning lines as the first main scanning lines, the ink is not ejected from the ejecting holes 96K and the color inks are ejected from the ejecting holes 96C, 96M and 96Y. The third time main scanning lines (the main scanning lines at the third time) and subsequent scanning lines (the main scanning lines at the subsequent time) are formed as described above.

When respective main scanning lines are formed, after the printing by the black ink which affects much if it mixes with the other colors is carried out, printing by the other colors is carried out. Thus, an amount of the black ink which mixes with other inks can be reduced. Accordingly, although a speed of printing processing is reduced to about half (time for the printing process becomes double), a sharper color image can be obtained.

Next, a description will be given of an image forming apparatus relating to a sixth embodiment. In the image forming apparatus relating to the sixth embodiment, as shown in FIG. 12, as compared to the fifth embodiment, positions of ejecting holes 106C, 106M and 106Y for ejecting the cyan (C) ink, the magenta (M) ink and the yellow (Y) ink, respectively are displaced in the intermittent relative feed direction (the subscanning direction) by the distance d with respect to those of the black (K). The arrangement position of an ejecting hole 106K for ejecting the black (K) ink is the same as in the fifth embodiment.

If inks are ejected from all ejecting holes 106K, 106M, 106C and 106Y (at the same time), and scanning is carried out with a recording head 104 at which these ejecting holes are formed such that an image is formed by a comb-teeth type printing, the black ink can be prevented from mixing with other inks. Accordingly, a sharp color image can be obtained without reduction in the printing speed.

The examples in which the LED lights are emitted on the photosensitive material, and the examples in which the image is formed by use of an ink jet type printer, are described above. However, the present invention is not limited to the same. The present invention can be applied to other image forming apparatuses within the scope of above mentioned aspects of the present invention.

Because the present invention has the above-described structure, the present invention can have the following effects.

In accordance with a first aspect of the present invention, the image quality can be improved.

In accordance with a second aspect of the present invention, it is possible to avoid that two pixels are recorded on the same position of an recorded material.

In accordance with a third aspect of the invention, it is possible to form an image while different operations for each recording element row are carried out.

In accordance with a fourth aspect of the invention, the spatial frequency of the irregularities in density is higher and is difficult to be viewed.

In accordance with a fifth aspect of the present invention, it is possible to form easily an image with improved image quality.

What is claimed is:

1. An image forming apparatus comprising a recording head including a plurality of recording elements for recording a plurality of pixels, the recording elements being disposed in an intermittent relative feed direction with different distances between adjacent recording elements including at least three different distances (a×d), (b×d) and (c×d), where a, b, c are natural numbers which are different from each other, and d is a minimum interval between adjacent pixels in the intermittent relative feed direction, such that irregularities in density, generated in an image formed by the recording elements, due to a feed amount error between a recorded material and the recording head in the intermittent relative feed direction, are generated in only an area with a spatial frequency of 1 lp/mm or more.

2. The image forming apparatus according to claim 1, wherein a plurality of recording element rows, in which each of recording element rows the recording elements are arranged, are provided in a direction substantially perpendicular to the intermittent relative feed direction.

3. The image forming apparatus according to claim 2, wherein the recording element rows are provided in at least two arrangement patterns.

4. An image forming apparatus comprising a recording head including a plurality of recording elements for recording a plurality of pixels, wherein each interval between the pixels in an intermittent relative feed direction, recorded substantially simultaneously by said recording elements, is a natural number multiplied by d, where d is a minimum interval between adjacent pixels in the intermittent relative feed direction, wherein a feed amount of the intermittent relative feed direction between a recorded material and the recording head is set to be (n×2×d/k), wherein n is a number of the recording elements and k is a natural number greater than or equal to 2, and wherein a pixel recorded by i th recording element is recorded on a position of the recorded material, which position is apart from a pixel recorded by a first recording element by a distance Li in the intermittent relative feed direction, and each distance between the recording elements in the intermittent relative feed direction is set such that a pixel is not recorded on a position of the recorded material, which position is apart from the pixel recorded by the first recording element by a distance {Li+j×(n×2×d/k)} in the intermittent relative feed direction, where j is a natural number.

5. The image forming apparatus according to claim 4, wherein a plurality of recording element rows, in which each of recording element rows the recording elements are arranged, are provided in a direction substantially perpendicular to the intermittent relative feed direction.

6. The image forming apparatus according to claim 4, wherein the recording element rows are provided in at least two arrangement patterns.

7. The image forming apparatus according to claim 4, wherein the first recording element is an element positioned at one end portion of a recording element row in which the plurality of recording elements are arranged.

8. An image forming apparatus which forms an image by repeating for a plurality of times a relative movement of a recorded material and a recording portion for recording an image in a subscanning direction at a predetermined amount and a relative movement of the recorded material and the recording portion in the main scanning direction, the image forming apparatus comprising:

a plurality of recording elements which are provided at the recording portion and which are arranged in at least one row in the subscanning direction;

wherein the plurality of recording elements are arranged in the subscanning direction with different distances between adjacent recording elements including at least three types of distances (a×d), (b×d) and (c×d), where a, b, c are natural numbers which are different from each other, and d is a minimum interval between adjacent pixels in the subscanning direction.

9. The image forming apparatus according to claim 8, wherein the plurality of recording elements are arranged in a plurality of recording element rows arranged in the main scanning direction.

10. The image forming apparatus according to claim 9, wherein the plurality of recording element rows are provided such that arrangement patterns of at least two recording element rows among the plurality of recording element rows are different.

11. An image forming method for forming an image on a recorded material by a comb-teeth type printing by using an image forming apparatus, the apparatus being set such that a recording head includes a plurality of recording elements for recording a plurality of pixels, the recording elements being disposed in an intermittent relative feed direction with different distances between adjacent recording elements including at least three different intervals (a×d), (b×d) and (c×d), where a, b, c are natural numbers which are different from each other, and d is a minimum interval between adjacent pixels in the intermittent relative feed direction, such that irregularities in density, generated in an image formed by the recording elements, due to a feed amount error between the recorded material and the recording head in the intermittent relative feed direction, are generated in only an area with a spatial frequency of 1 lp/mm or more.

12. An image forming apparatus comprising a recording head including a plurality of recording elements for recording a plurality of pixels, wherein each interval between the pixels in an intermittent relative feed direction, recorded substantially simultaneously by said recording elements, is a natural number multiplied by d, wherein a minimum interval between adjacent pixels in the intermittent relative feed direction is d, and a feed amount of the intermittent relative feed direction between a recorded material and the recording head is set to be (n×2×d/k), wherein a number of the recording elements is n, k is a natural number greater than or equal to 2, such that irregularities in density, generated in an image formed by the recording elements, due to a feed amount error between a recorded material and the recording head in the intermittent relative feed direction, are generated in only an area with a spatial frequency of 1 lp/mm or more.

13. An image forming method for forming an image on a recorded material by a comb-teeth type printing by using an image forming apparatus, the apparatus being set such that a plurality of recording elements for recording a plurality of pixels are provided at a recording head, wherein each interval between the pixels in an intermittent relative feed direction, recorded substantially simultaneously by said recording elements, is a natural number multiplied by d, wherein a minimum interval between adjacent pixels in the intermittent relative feed direction is d; and a feed amount of the intermittent relative feed direction between the recorded material and the recording head is set to be (n×2×d/k), wherein a number of the recording elements is n, k is a natural number greater than or equal to 2, such that irregularities in density, generated in an image formed by the recording elements, due to a feed amount error between the recorded material and the recording head in the intermittent relative feed direction, are generated in only an area with a spatial frequency of 1 lp/mm or more.

* * * * *